United States Patent [19]

David et al.

[11] Patent Number: 5,028,658

[45] Date of Patent: Jul. 2, 1991

[54] SHEET OF POLYVINYL BUTYRAL AND POLYURETHANE

[75] Inventors: Donald J. David, Amherst, Mass.; Thomas F. Sincock, Weatogue, Conn.

[73] Assignee: Monsanto Company, St. Louis, Mo.

[21] Appl. No.: 408,831

[22] Filed: Sep. 18, 1989

[51] Int. Cl.$^5$ ................... C08G 63/48; C08G 63/91; C08F 283/04; B32B 27/40

[52] U.S. Cl. ................... 525/58; 428/425.5; 428/425.6; 525/455; 525/456

[58] Field of Search .............. 428/425.5, 425.6; 525/58, 455, 456

[56] References Cited

U.S. PATENT DOCUMENTS

| | | | |
|---|---|---|---|
| 3,431,224 | 3/1969 | Goldblum | 260/13 |
| 3,458,388 | 7/1969 | Moynihan | 428/425.6 |
| 3,620,905 | 11/1971 | Ahramjian | 428/425.6 |
| 3,671,370 | 6/1972 | Littell, Jr. | 428/425.6 |
| 3,979,548 | 9/1976 | Schäfer et al. | 428/437 |
| 4,937,147 | 6/1990 | Cartier et al. | 428/425.5 |

FOREIGN PATENT DOCUMENTS

| | | | |
|---|---|---|---|
| 834106 | 2/1970 | Canada . | |
| 2228299 | 1/1974 | Fed. Rep. of Germany | 428/425.6 |
| 57-199650 | 12/1982 | Japan | 428/425.6 |
| 58-213660 | 12/1983 | Japan | 428/425.6 |
| 59-226063 | 12/1984 | Japan . | |
| 61-238869 | 10/1986 | Japan . | |
| 2134445 | 8/1984 | United Kingdom | 428/425.6 |

*Primary Examiner*—Melvyn I. Marquis
*Assistant Examiner*—W. R. M. Clark
*Attorney, Agent, or Firm*—Michael J. Murphy; William J. Farrington

[57] ABSTRACT

A sheet formed of a polyblend comprising, on a weight basis, a) 30 to 90% polyvinyl butyral containing about 11 to 30% hydroxyl groups and b) 70 to 10% thermoplastic polyurethane which is the reaction product of:

(i) polyether polyol or a mixture of polyether polyol and polyester polyol; and
(ii) aliphatic diisocyanate, aromatic diisocyanate or a mixture of aliphatic and aromatic diisocyanates;

the combined percentages of a) plus b) in the polyblend always equaling 100%; such sheet at 0.76 mm thickness having no greater than 2% haze.

14 Claims, No Drawings

SHEET OF POLYVINYL BUTYRAL AND POLYURETHANE

BACKGROUND OF THE INVENTION

This invention relates to interlayer sheet for safety glass assemblies and more particularly to such sheet formed of polyblends of polyvinyl butyral and polyurethane.

Polyvinyl butyral (PVB) sheet is widely used as a clear, transparent, shock-absorbing interlayer in laminated safety glazings for motor vehicle, aircraft, architectural, security (e.g. cashier booths, prison windows, jewelry display cases etc.) and like applications. For example, an automotive windshield containing such interlayer laminated between glass sheets can absorb a blow from an occupant's head without shattering and in doing so dissipates significant impact energy as the windshield undergoes essentially plastic deformation.

When used as interlayer, significant plasticizer is usually present in the PVB and this can limit the service application or, alternatively, dictate the choice of plasticizer when the PVB is adhered to a non-glass surface in a multi-layer laminate. Such special plasticizers, however, usually detract from other desirable laminate properties.

Moreover, it is further known that the optimum level of adhesion of plasticized PVB interlayer to glass (via reaction of residual hydroxyl groups with SiOH groups on the glass surface) occurs at nominal temperatures of about 15°–21° C. and this is why it is preferred in safety glazings. However, glass adhesion (and therefore the energy-absorbing properties of the laminate) appreciably deteriorates on either side of this temperature range e.g., at 0° F. (−17.7° C.) and 120° F. (49° C.).

Furthermore, as designers provide additional sophisticated performance features in safety glazings by incorporating added functional layers, it is necessary to be concerned with adherence of the PVB to such layers to preserve the desired energy-absorption properties.

SUMMARY OF THE INVENTION

Now improvements have been made in PVB sheet which minimize or overcome the aforementioned deficiencies of the prior art.

Accordingly, a principal object of this invention is to provide a sheet formed of a mechanically and optically compatible blend of PVB with another polymer.

Another object is to provide such a sheet wherein the other polymer is selected to enhance properties in which PVB alone is deficient.

An additional object is to provide sheet formed of mechanically and optically compatible blends of PVB and polyurethane (PU), either with or without plasticizer, having properties which can be controllably varied depending on the blend ratio of components.

Other objects of this invention will in part be obvious and will in part appear from the following description and claims.

These and other objects are accomplished by providing a sheet formed of a polyblend comprising, on a weight basis, (a) 30 to 90% PVB containing about 11 to 30%, preferably about 15 to 25%, hydroxyl groups and (b) 70 to 10% thermoplastic polyurethane which is the reaction product of:

(i) polyether polyol or a mixture of polyether polyol and polyester polyol; and (ii) aliphatic diisocyanate, aromatic diisocyanate or a mixture of aliphatic and aromatic diisocyanates;

the combined percentages of (a) plus (b) in the polyblend always equaling 100%, such sheet at 30 mils (0.76 mm) thickness having no greater than 2% haze. The sheet may optionally contain plasticizer and the preferred polyurethane is prepared from cycloaliphatic diisocyanate and polyether polyol. The preferred component ranges in the polyblend of the sheet are 30 to 70% PVB and 70 to 30% PU, with 60/40 PVB/PU most preferable.

DETAILED DESCRIPTION OF THE INVENTION

The PVB component of the polyblends used to form sheet of the invention has a Staudinger molecular weight of about 50,000 to 600,000, preferably 55,000 to 170,000 and constitutes on a weight basis about 11 to 30% hydroxyl groups, calculated as polyvinyl alcohol, 0 to 5% ester groups, calculated as polyvinyl ester, e.g. 0 to 2.5% acetate groups, calculated as polyvinyl acetate, with the balance being butyral groups. Preferred PVB resins contain on a weight basis, about 15 to 25% (e.g. 18–25%) of such hydroxyl groups.

PVB resin is produced by known aqueous or solvent acetalization processes wherein polyvinyl alcohol is reacted with butyraldehyde in the presence of an acid catalyst to produce PVB, followed by neutralization of the catalyst, separation, stabilization and drying of the PVB resin.

For optical and mechanical compatibility with PVB the PU component of the polyblends must be a preformed thermoplastic polyurethane (TPU) which is uncrosslinked. Reactive cross-linkable polyurethanes are not usable because of the chemical reaction which will occur with hydroxyls of the PVB component. Functional TPU's contain hard and soft segments formed respectively of polymerized diisocyanate and polyol components. The ratio or weight % of hard to soft segments determines the physical properties of the TPU. In synthesizing TPU a difunctional chain extender such as a diol or diamine is used to space diisocyanate molecules in the polymer chains. A prepolymer of diisocyanate and difunctional chain extender is preferably first prepared to avoid toxicity problems associated with handling monomeric isocyanate.

The diisocyanate can be saturated aliphatic, either linear or cycloaliphatic (including mixtures of same) or aromatic (including mixtures of same) or mixtures of aliphatic and aromatic diisocyanates, provided always that sheet formed from blends containing TPU's made from such various diisocyantes at 30 mils (0.76mm) thickness must have no greater than 2% haze, as hereinafter further described. Cycloaliphatic diisocyanates are preferred and comprise cyclohexyl diisocyanate having one or two cyclohexyl ring groups. Methylene bis (4-cyclohexyl) diisocyanate is most preferred.

The polyol component is a polyether polyol or a mixture or polyether polyol(s) and polyester polyol(s), such as linear long chain polyether or polyester diols, the molecular weight of which determines the hardness of the TPU and its compatibility with PVB in the polyblend. By selectively choosing polyol molecular weight and blending the TPU obtained with PVB, it is possible to obtain a family of mechanically and optically compatible polymers which can be used to form sheet having properties tailored for specific applications. Preferred polyols are polyether polyols such as polytetraalkylene ether glycols where alkylene is $C_1$-$C_4$. For optimum compatibility in the polyblend, polytetralkylene ether glycol molecular weight should be between about 90 to 4000, preferably 650 to 3000.

A plasticizer (or blend of plasticizers) capable of solvating the polyblend which is compatible with both the TPU and PVB can optionally be included, usually depending on the sheet application and the proportions of constituents present, the greater the content of rubbery TPU the less may be the need for a plasticizer to reduce melt viscosity during shaping. Haze level in sheets formed from blends determines optical compatability, a value of not more than 2% haze in a 30 mil (0.76 mm) thick sheet showing optical compatability. Potential plasticizer(s) include phthalates such as dibutyl, dihexyl, dioctyl, diundecyl and diisodecyl phthalate, adipates such as dihexyl and diocytl adipate, phosphates such as tricresyl and triphenyl phosphate and the like. Polytetramethylene ether glycol is particularly useful at loadings of between about 3 to about 20 parts per 100 parts TPU/PVB polyblend.

The forming operation to prepare interlayer sheet from the blends is according to procedures known in the art. Forming includes fusing or melting the polymeric thermoplastic polyblend by physical working at temperatures of about 150 to 210° C., followed by shaping of the melt into clear, transparent sheeting having a thickness of about 5 to 50 mils (0.13 to 1.3 mm). Shaping from the melt can be in conjunction with extrusion using a screw extruder or by compression molding, mill rolling or like process. Preferred shaping systems involve extrusion of plasticized blend melt through a conventional sheeting die by forcing the molten polymer through a horizontally long, vertically narrow die opening substantially conforming in length and width to that of the sheet being formed, or by using a die roll system, i.e. by casting the molten polymer issuing from an extrusion die onto a specially prepared surface of a die roll in close proximity to the exit of such die.

Conventional techniques known to those skilled in the art can be used in association with the extrusion process to produce a rough surface on one or both sides of the extruding sheet. These involve the specification and control of one or more of the following: polymer molecular weight distribution, water content of the melt, melt and die exit temperature, die exit geometry etc. Systems describing such techniques are disclosed in U.S. Pat. Nos. 2,904,844,; 2,909,810; 3,994,654; 4,575,540 and published European Application No. 0185,863.

In addition to plasticizers, the interlayer sheet of this invention may contain other additives such as dyes, ultraviolet light stabilizers, adhesion control salts, antioxidants and may be treated with additives to improve laminating efficiency.

The invention is further described in the following illustrative examples which are not meant to restrict the invention. Unless otherwise indicated, all quantities are expressed in weight.

The following tests were used to provide the values and results listed in the Tables:

% Haze—ASTM D1003-01 (Reapproved 1977)—
  Procedure A—using a Hazemeter, Hunter lab Model D25 from Hunter Associates Inc., Reston, Va. This measures optical compatibility of blend components Initial Tear Resistance—(MTR) ASTM D1004—66 (Reapproved 1981). This measures mechanical compatibility of the polyblend components.

Glass Transition Temperature (Tg)—using a Differential Scanning Calorimeter. This measures thermodynamic compatibility, i.e. whether molecular mixing of the blend components occurs.

Mean Penetration Velocity(MPV)—glass laminates were positioned horizontally in a metal frame and, while at a constant laminate temperature, a five pound (2.27kg) spherical ball was dropped from a designated height against the center of the laminate. This was repeated at increasing ball-drop heights. Two magnetic coils were vertically spaced from each other beneath the test laminate. After penetrating the laminate, the ball passed sequentially through magnetic fields created by the two coils and as these fields were disturbed, the top coil triggered a timer "on" switch while the bottom coil turned it off. Knowing the distance between coils and the time to traverse the distance permits calculating the ball velocity. This residual ball velocity is related to the energy absorbed by the laminate and absorbed energy in miles per hour (mph) is equal to the Mean Penetration Velocity (MPV) of the laminate.

EXAMPLE 1

This identifies polyurethanes capable of forming optically compatible polyblends with polyvinyl butyral. Optically compatible polyblends as 30 mil (0.76 mm) sheet are haze-free to the eye, i.e. are considered to have $\leq 2$ Haze.

The PVB had a nominal 18% residual polyvinyl alcohol, was in powder form and is available from Monsanto Company as Butvar ® resin.

PVB and PU pellets (without plasticizer) were dried in hot air to less then 1% $H_2O$ and then tumble blended. The dry blend was then charged to a Brabender intensive mixer maintained at 190° C. and mixed until fluxed (i.e. as a fusion blend of an intimate admixture of the components) and then for 4 additional minutes. Mixer blades were rotating at about 70 rpm. Each blend was removed from the mixer and cooled to room temperature. Thirty mil (0.76 mm) sheets were compression molded from the blends using heated (350° F./176.7° C.) platens at a pressure of 4000-5000 psi (27,560-34,450 kPa). The platens were faced with Mylar film to minimize sticking. Sheet samples were cooled to room temperature while in the press. Haze results were as follows:

TABLE I

| TPU Type | | | % Haze | |
|---|---|---|---|---|
| Isocyanate | Polyol | % TPU In Blend | 20 | 40 |
| cycloaliphatic | polyether[1] | | 1.60 | 1.53 |
| aromatic | polyether[2] | | 1.24 | 5.60 |
| aromatic | polyester[3] | | 90.7 | — |

[1]TPU from Thermedics Inc. of Woburn, Mass. as Tecoflex EG-85A
[2]TPU from Dow Chemical Co. as Pellathane 2103-70A
[3]TPU from Dow Chemical Co. as Pellathane 2355-85ABR The above data illustrates sheet formed from optically compatible, unplasticized polyblends of PVB and thermoplastic aliphatic PU formed from cycloaliphatic diisocyanate and polyether polyol. Likewise within the scope of the invention is the sheet at <2% (i.e. 1.24) haze formed of the polyblend containing TPU made from aromatic diisocyanate and polyether polyol at the 20% TPU level in the blend.

The above procedure was repeated using 1% and 2% in the blend of a reactive polyurethane in the form of a liquid prepolymer obtained from Uniroyal Chemical Co. as Adiprene LW520 containing significant unreacted isocyanate. The PVB/PU blends crosslinked in the Brabender to an infusible thermoset block which would not melt and were not considered thermoplastic. This is due to reaction between the residual hydroxyl of the PVB and the diisocyanate of the PU which does not occur using a thermoplastic PU because all hydroxy-reactive isocyanate groups are substantially fully reacted.

EXAMPLE 2

This shows optically, mechanically, and thermodynamically compatible polyblends at various concentrations of PVB and TPU. The TPU was the reaction product of methylene bis (cyclohexyl) diisocyanate (HMD), poly (tetramethylene ether glycol) (PTMEG) and 1,4 butane diol (chain extender). This TPU is available from Thermedics Inc, Woburn, Mass., as Tecoflex EG-85A.

The procedure of Example 1 was repeated at various blend ratios without plasticizer. Sheets prepared from the blends were nominal 30 mil (0.76mm) thick. Results were as follows:

TABLE II

| Property | % TPU | | | | |
|---|---|---|---|---|---|
| | 0* | 0 | 10 | 20 | 40 | 60 |
| % Haze | <1 | <1 | 1.95 | 1.60 | 1.53 | 2.51 |
| MTR (kN/m) | 52.5 | 280 | 275 | 220 | 119 | 82 |
| Tg (°C.) | 18 | 73 | 63 | 59 | 42 | 22 |

*contained 32 phr dihexyl adipate

The above data showing less than 2% haze illustrates 30 mil sheet formed from unplasticized optically compatible blends at TPU concentrations from 10 to somewhat less than 60%. The MTR data reflecting mechanical compatability shows that at 10–60% TPU, MTR exceeds the 52.5 kN/m of the plasticized 100% PVB control (i.e. 0 TPU). The single Tg's reflect thermodynamic compatability of the components.

EXAMPLE 3

This shows compatible plasticizers at various blend ratios.

The procedure of Example 1 was repeated at various blend ratios using dihexyl adipate and various polytetramethylene ether glycols (PTMEG) as plasticizers at various loadings shown in Table III as parts per hundred resin (phr) units. PTMEG is available as Terathane from E.I. Dupont de Nemours and Co.; molecular weight was 650 to 2000. The plasticizer(s) were added during dry blending where it was dispersed in and absorbed by the polymer solids. Results were as follows:

TABLE III

| Efficiency of Plasticizers in PVB/TPU Blends | | | | | | | | | | | |
|---|---|---|---|---|---|---|---|---|---|---|---|
| PVB, % | 80 | 60 | 60 | 60 | 60 | 60 | 60 | 60 | 60 | 60 | 60 |
| Tecoflex 85A, % | 20 | 40 | 40 | 40 | 40 | 40 | 40 | 40 | 40 | 40 | 40 |
| Dihexyl adipate | 15 | 15 | | | | | | | | | |
| Terathane 650 | | | 5 | 10 | 15 | | | | | | |
| Terthane 1000 | | | | | | 5 | 10 | 15 | | | |
| Terathane 2000 | | | | | | | | | 5 | 10 | 15 |
| MTR (kN/m) | 56 | 43.8 | 89.2 | 63 | 52.5 | 68.2 | 54.2 | 56 | 71.8 | 63 | 54.2 |
| % Haze | 1.9 | 2.3 | 2.6 | 1.5 | 1.5 | 2.1 | 1.6 | 1.4 | 3.3 | 3.6 | 5.7 |
| Tg, °C. | 29 | 28 | 32 | 30 | 15 | 34 | 33 | 29 | 33 | 34 | 26 |

In view of <2% haze, MTR values comparable with that for conventional plasticized PVB (52.5 kNa/m from Ex. 2) and single Tg's, these results illustrate sheet of plasticized PVB/TPU polyblends.

As PTMEG molecular weight decreases, plasticizing effectiveness increases at constant phr loadings. Therefore, as the PVB/TPU ratio in the blend is varied it may be necessary to use PTMEG's of different molecular weights and amounts to get the desired compatibility; for example, at higher PTMEG molecular weight, more than 15 phr may be required.

EXAMPLE 4

This shows how glass laminate impact performance varies with temperature using sheet of the invention.

14"×14" (35.6×35.6 cm) two ply glass laminates were prepared using 30 mil sheet at 60/40 PVB/TPU at 320° F. (160° C.) and 225 psi (1550 kPa) laminating conditions. Saflex TG sheet made from the Butvar ® resin of Example 1 containing 32 phr dihexyl adipate was the control. TPU was Tecoflex EG-85A; plasticizer (7.5 phr) was Terethane 650 (polytetramethylene ether glycol). Five laminates and controls were tested. Results (average for the five samples) were as follows:

TABLE IV

| | MPV (mph) at Temperature | | |
|---|---|---|---|
| Laminate Interlayer | 0° F. (−17° C.) | 60° F. (15.6° C.) | 120° F. (48.4° C.) |
| Saflex TG (control) | 16.8 | 26.0 | 19.6 |
| PVB/TPU (unplasticized) | 18.6 | 22.3 | 24.9 |
| PVB/TPU (plasticized) | 21.6 | 22.3 | 22.9 |

The above data shows that in comparison with the plasticized PVB sheet control, impact performance of laminates using sheet formed from an unplasticized 60/40 blend (i) at 0° F. was better than the control; (ii) at 60° F. was somewhat less than the control while (iii) at 120° F. was significantly (27%) better than the control. Importantly, the addition of 7.5 phr plasticizer produced a nearly flat impact versus temperature profile vis-a-vis the control. This means that in commercial systems safety performance need not be compromised at the ends of the temperature range to which in service the laminate, such as a windshield, might be exposed.

EXAMPLE V

This shows haze level of sheet from blends containing various types and concentrations of TPU's.

The procedures of Example I for preparing the blends and sheet (30 mil, 0.76 mm thick) are repeated. Haze results were as follows:

TABLE V

| Component Trade Name | TPU Type | Weight % in Blend | | | |
|---|---|---|---|---|---|
| Butvar ® PVB resin | — | 60 | 60 | 60 | 60 |
| Tecoflex EG-85A | aliphatic polyether | 24 | 32 | 24 | 32 |
| Quinn[1] PN03-101 | aliphatic polyester | 16 | 8 | — | — |
| Pellathane 2103-70A | aromatic polyether | — | — | 16 | 8 |
| % Haze | | 8.9 | 3.0 | 1.7 | 1.8 |

[1] K. J. Quinn & Co. Inc., Malden, Mass.

These data show that by manipulating concentration and choosing TPU type blended with PVB, 30 mil (0.76mm) thick sheet having ≦2 haze can be obtained.

The preceding description is for illustration only and is not to be taken in a limited sense. Various modifications and alterations will be readily suggested to persons skilled in the art. It is intended, therefore, that the foregoing be considered as exemplary only and that the scope of the invention be ascertained from the following claims.

We claim:

1. A sheet formed of a polyblend comprising, on a weight basis, (a) 30 to 90% polyvinyl butyral containing 11 to 30% hydroxyl groups and (b) 70 to 10% thermoplastic polyurethane which is the reaction product of:
   (i) polyether polyol or a mixture of polyether polyol and polyester polyol; and
   (ii) aliphatic diisocyanate, aromatic diisocyanate or a mixture of aliphatic and aromatic diisocyanates; the combined percentages of (a) plus (b) in the polyblend always equaling 100%;
   said sheet at 0.76 mm thickness in a laminate with glass having no greater than 2% haze.

2. The sheet of claim 1 containing plasticizer.

3. The sheet of claim 1 devoid of plasticizer.

4. The sheet of any of claims 1, 2 or 3 wherein the polyvinyl butyral contains about 15 to 25% hydroxyl groups.

5. The sheet of claim 4 wherein the polyblend contains 30 to 70% polyvinyl butyral and 70 to 30% polyurethane.

6. The sheet of claim 5 wherein the polyurethane is prepared using a polyether polyol.

7. The sheet of claim 6 wherein the polyurethane is prepared from cycloaliphatic diisocyanate and said polyether polyol.

8. An energy-absorbing, thermoplastic sheet having no more than 2% haze in a laminate with glass comprising:
   (a) 100 weight parts of a compatible mixture of 30 to 70 weight % polyvinyl butyral containing about 15 to 25 weight % hydroxyl groups and 70 to 30 weight percent aliphatic polyurethane; and
   (b) about 3 to about 20 weight parts plasticizer.

9. The sheet of claim 8 wherein the polyurethane is the reaction product of an aliphatic diisocyanate and polyether polyol.

10. The sheet of claim 9 wherein the diisocyanate has one or two cyclohexyl ring groups.

11. The sheet of claim 10 wherein the polyether polyol is polytetraalkylene ether glycol.

12. The sheet of any of claims 8, 9, 10 or 11 wherein the plasticizer is polytetramethylene ether glycol.

13. The sheet of claim 12 wherein the molecular weight of the polytetramethylene ether glycol is between about 90 to 4000.

14. The sheet of claim 13 wherein said molecular weight is between 650 to 3000.

* * * * *